United States Patent
Kim et al.

(10) Patent No.: US 9,986,545 B2
(45) Date of Patent: May 29, 2018

(54) METHOD FOR APPLYING PHYSICAL RESOURCE BLOCK (PRB) BUNDLING IN WIRELESS COMMUNICATIONS SYSTEM AND APPARATUS THEREFOR

(71) Applicant: LG Electronics Inc., Seoul (KR)

(72) Inventors: Hyungtae Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 14/772,903

(22) PCT Filed: Mar. 5, 2014

(86) PCT No.: PCT/KR2014/001804
§ 371 (c)(1),
(2) Date: Sep. 4, 2015

(87) PCT Pub. No.: WO2014/137154
PCT Pub. Date: Sep. 12, 2014

(65) Prior Publication Data
US 2016/0021642 A1   Jan. 21, 2016

Related U.S. Application Data

(60) Provisional application No. 61/773,780, filed on Mar. 6, 2013.

(51) Int. Cl.
*H04W 72/04* (2009.01)
*H04L 5/00* (2006.01)
*H04L 25/02* (2006.01)

(52) U.S. Cl.
CPC ......... *H04W 72/042* (2013.01); *H04L 5/0035* (2013.01); *H04L 5/0039* (2013.01);
(Continued)

(58) Field of Classification Search
CPC .. H04W 72/042; H04L 5/0035; H04L 5/0039; H04L 5/0048
See application file for complete search history.

(56) References Cited

U.S. PATENT DOCUMENTS

2011/0170498 A1 * 7/2011 Liu ...................... H04L 5/0053
370/329
2011/0255505 A1   10/2011 Liu et al.
(Continued)

FOREIGN PATENT DOCUMENTS

WO   2011160097 A1   12/2011

OTHER PUBLICATIONS

International Search Report from PCT/KR2014/001804, dated Jun. 20, 2014.
(Continued)

*Primary Examiner* — Albert T Chou
(74) *Attorney, Agent, or Firm* — Dentons US LLP

(57) ABSTRACT

The present invention relates to a wireless communications system. In a wireless communications system according to an embodiment of the present invention, a method for applying a PRB (Physical Resource Block) bundling by a first cell includes the steps of: receiving the traffic information of a second cell; determining a resource for the first and the second cell to apply the same PRB bundling; and transmitting the information of the resource.

7 Claims, 11 Drawing Sheets

(52) U.S. Cl.
CPC .......... *H04L 5/0048* (2013.01); *H04L 5/0094* (2013.01); *H04L 25/0202* (2013.01); *H04L 5/0023* (2013.01)

(56) References Cited

U.S. PATENT DOCUMENTS

| | | | |
|---|---|---|---|
| 2011/0310829 A1 | 12/2011 | Ji et al. | |
| 2012/0188950 A1* | 7/2012 | Luo | H04L 5/0035 370/329 |
| 2013/0051265 A1 | 2/2013 | Barbieri et al. | |
| 2013/0053078 A1* | 2/2013 | Barbieri | H04B 7/024 455/509 |
| 2013/0242886 A1* | 9/2013 | Chen | H04W 52/243 370/329 |

OTHER PUBLICATIONS

Written Opinion of the ISA from PCT/KR2014/001804, dated Jun. 20, 2014.

\* cited by examiner

FIG. 5
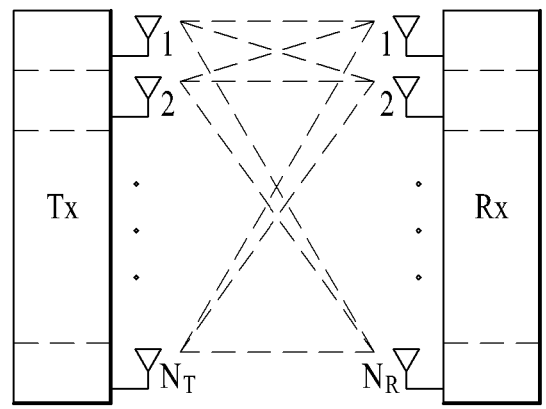
(a)
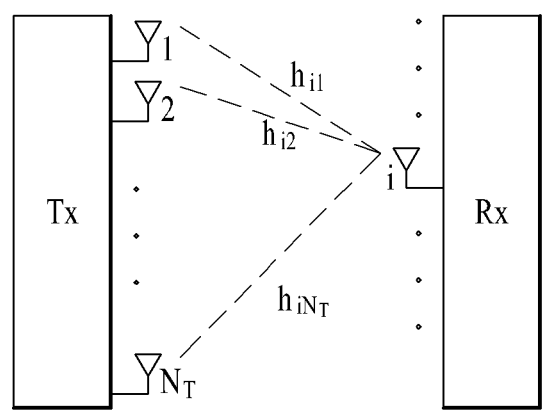
(b)

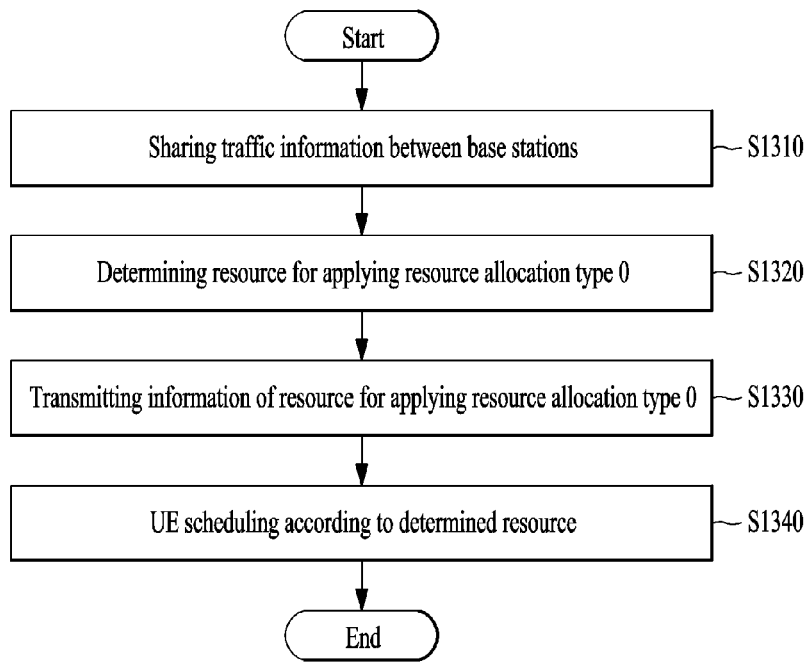
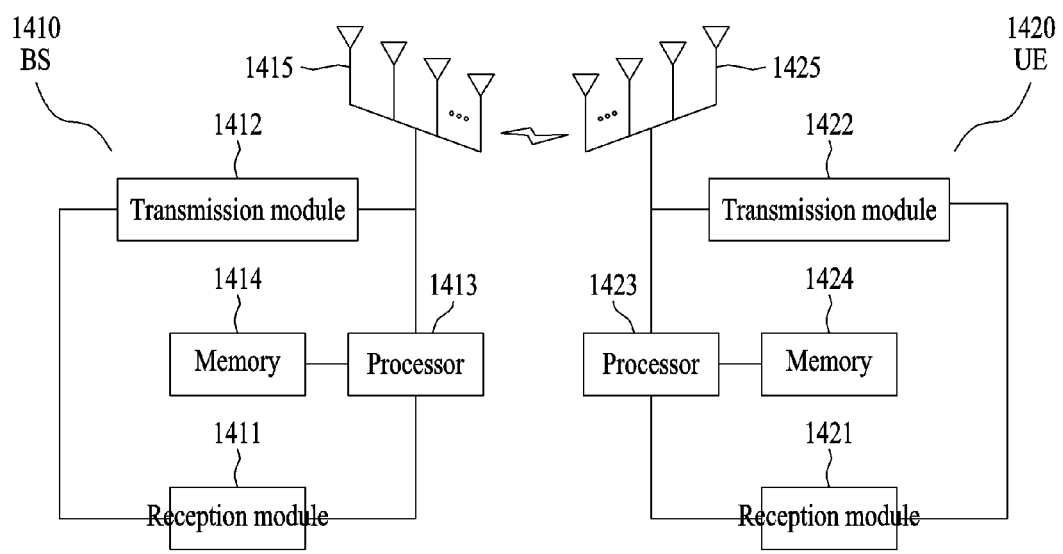

METHOD FOR APPLYING PHYSICAL RESOURCE BLOCK (PRB) BUNDLING IN WIRELESS COMMUNICATIONS SYSTEM AND APPARATUS THEREFOR

This application is a 35 USC § 371 National Stage entry of International Application No. PCT/KR2014/001804 filed on Mar. 5, 2014, and claims priority to U.S. Provisional Application No. 61/773,780 filed on Mar. 6, 2013, all of which are hereby incorporated by reference in their entireties as if fully set forth herein.

FIELD OF THE INVENTION

The present invention relates to a wireless communications system and, most particularly, to a method and apparatus for deciding resources enabling a same PRB (Physical Resource Block) bundling to be applied to a first cell and a second cell in a wireless communications system.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on coordinated multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communications system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communications system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DETAILED DESCRIPTION OF THE INVENTION

Technical Objects

Based on the aforementioned discussion, an object of the present invention is to provide a method and apparatus for applying PRB bundling in a wireless communications system.

The technical objects that can be achieved through the present invention are not limited to what has been particularly described hereinabove and other technical objects not described herein will be more clearly understood by persons skilled in the art from the following detailed description.

Technical Solutions

In order to resolve the above-described problem, a method for applying a PRB (Physical Resource Block) bundling by a first cell in a wireless communications system according to an exemplary embodiment of the present invention may include the steps of receiving a traffic information of a second cell; determining a resource for the first and the second cell to apply the same PRB bundling; and transmitting an information on the resource to a user equipment.

A method of a user equipment for estimating a channel in a wireless communications system according to another exemplary embodiment of the present invention may include the steps of receiving an information on a resource for a first cell and a second cell to apply the same PRB (Physical Resource Block) bundling from the first cell; and estimating a channel based upon the information on the resource.

A base station applying a PRB (Physical Resource Block) bundling in a wireless communications system according to yet another exemplary embodiment of the present invention may include a RF (Radio Frequency) unit; and a processor, wherein the processor may be configured to receive a traffic information of a neighboring base station, to determine a resource for the base station and the neighboring base station to apply the same PRB bundling, and to transmit an information on the resource to a user equipment.

A user equipment estimating a channel in a wireless communications system according to yet another exemplary embodiment of the present invention may include a RF (Radio Frequency) unit; and a processor, wherein the processor may be configured to receive an information on a resource for a first cell and a second cell to apply the same PRB (Physical Resource Block) bundling from the first cell, and to estimate a channel based upon the information on the resource.

The following features may be commonly applied to the exemplary embodiments of the present invention.

The resource for applying the same PRB bundling may be decided based upon a minimum value between a first traffic size being transmitted by having the first cell apply PRB bundling and a second traffic size being transmitted by having the second cell apply PRB bundling.

The resource for applying the same PRB bundling may be sequentially decided starting from a subframe of a lower index.

The information on the resource for applying the same PRB bundling may be configured by a bitmap method.

The information on the resource for applying the same PRB bundling may be transmitted by using RRC (Radio Resource Control) signaling.

The information on the resource for applying the same PRB bundling may be transmitted by using DCI (Downlink Control Information).

The general description of the present invention provided above and the detailed description of the present invention that will follow are merely exemplary and are provided for additional description of the appended claims of the present invention.

Advantageous Effects

According to the exemplary embodiment of the present invention, PRB bundling may be applied for efficiently in a wireless communications system.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

FIG. 5 illustrates a configuration of a wireless communications system having multiple antennae.

FIG. 13 illustrates a flow chart of a method according to the second exemplary embodiment of the present invention.

FIG. 14 illustrates a base station and a user equipment that can be applied to an exemplary embodiment of the present invention.

BEST MODE FOR CARRYING OUT THE PRESENT INVENTION

Figure 1:
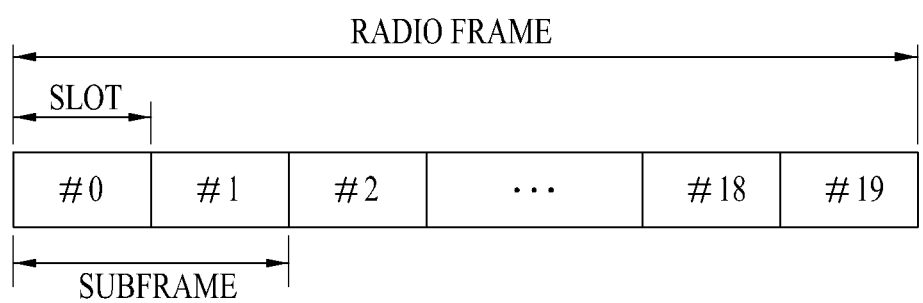
FIG. 1 illustrates an exemplary structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communications system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
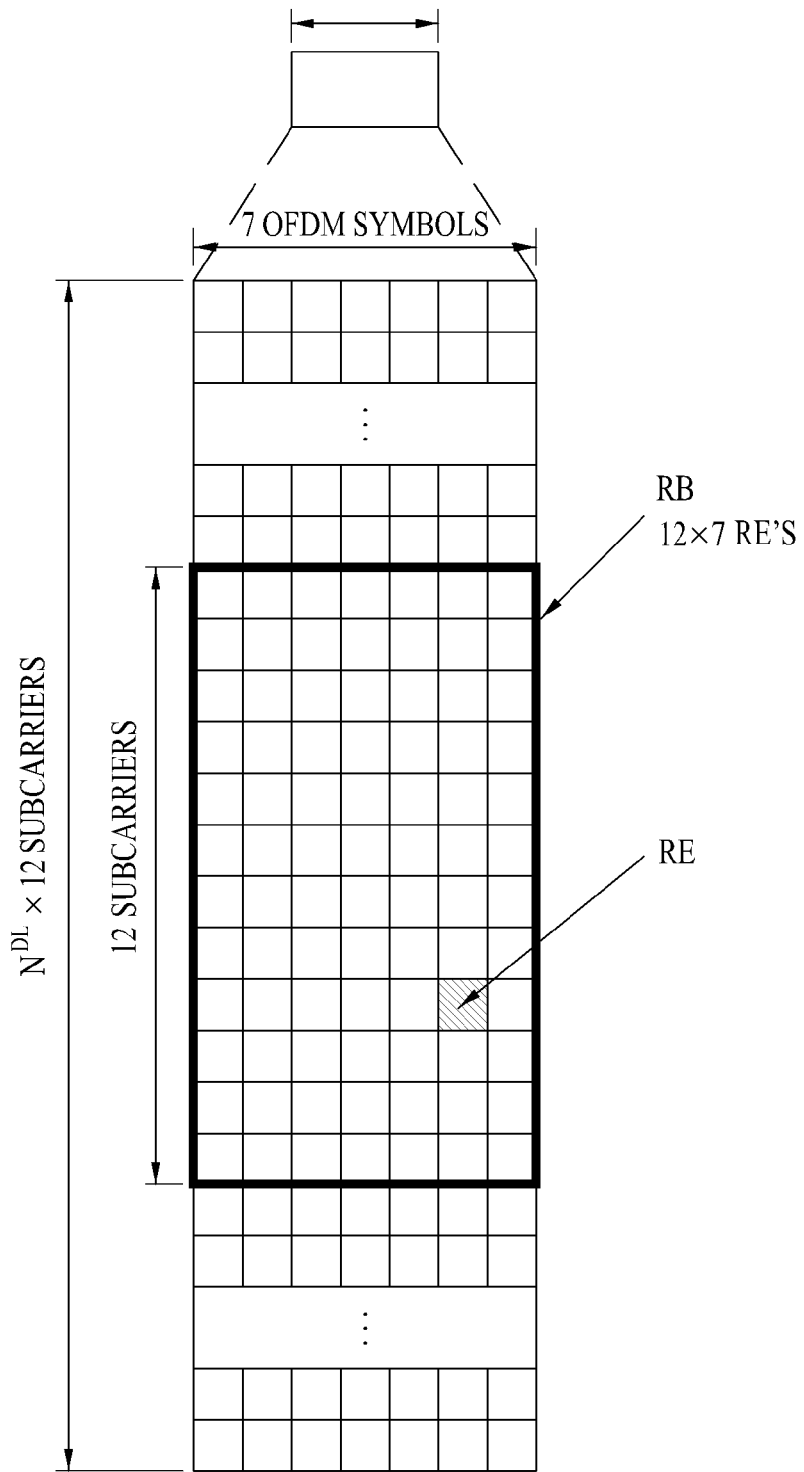
FIG. 2 illustrates an example of a resource grid respective to one downlink slot.

FIG. 2 illustrates an example of a resource grid respective to one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a $k_{th}$ subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. $N^{DL}$ is number of RBs in a downlink slot. $N^{DL}$ depends on a downlink transmission bandwidth configured by BS scheduling.

Figure 3:
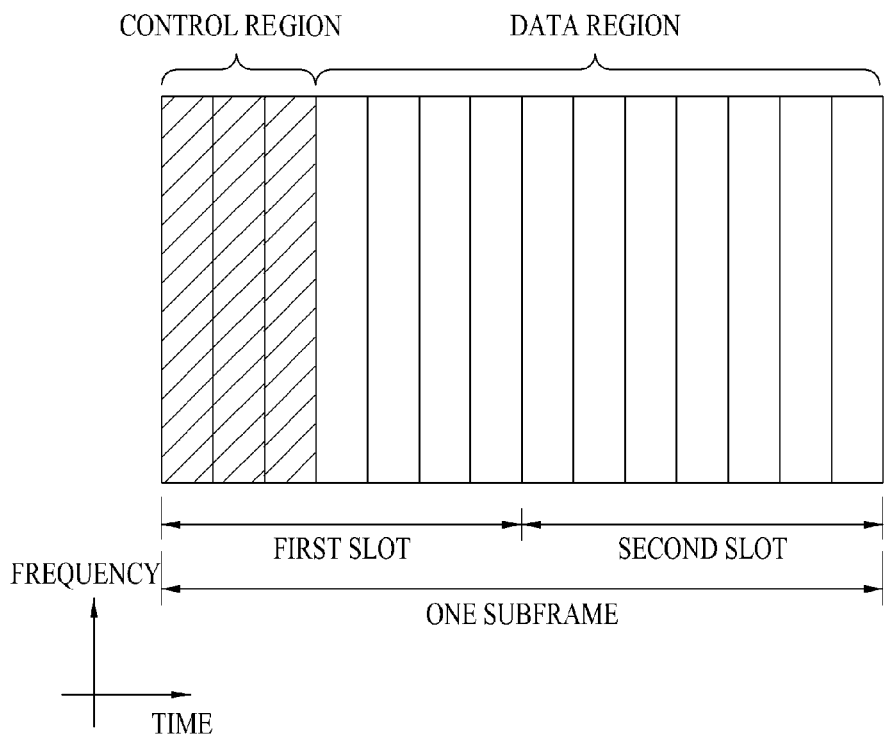
FIG. 3 illustrates a structure of a downlink subframe.

FIG. 3 illustrates a structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
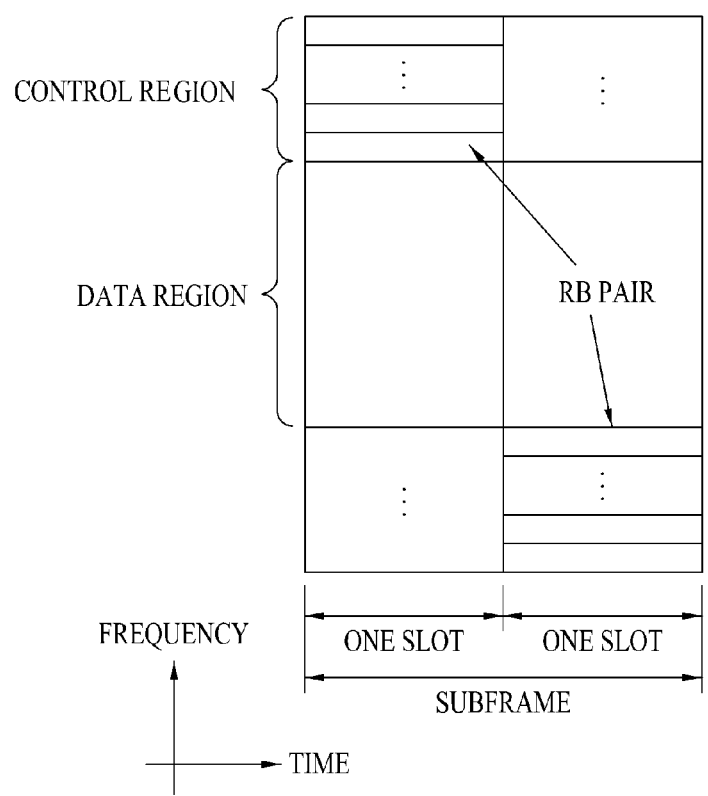
FIG. 4 illustrates a structure of an uplink subframe.

FIG. 4 illustrates a structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates a configuration of a wireless communications system having multiple antennae. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate $R_o$ that may be achieved with a single antenna and a transmission rate increase Ri.

$$R_i = \min(N_T, N_R) \quad \text{[Equation 1]}$$

For instance, a MIMO communications system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that $N_T$ Tx antennas and $N_R$ Rx antennas are present in the system.

Regarding a transmission signal, up to $N_T$ pieces of information can be transmitted through the $N_T$ Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2 \ldots s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vectors $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \quad \text{[Equation 5]}$$

$$\begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Here, $w_{ij}$ refers to a weight between an $i_{th}$ Tx antenna and $j_{th}$ information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of $N_R$ Rx antennas, a reception signal of each antenna may be expressed as the vector shown in Equation 6 below.

$$y=[y_1, y_2, \ldots, y_{N_R}]^T \qquad \text{[Equation 6]}$$

When a channel modeling is executed in the MIMO communications system, individual channels can be distinguished from each other according to transmission/reception (Tx/Rx) antenna indexes. A channel passing the range from a Tx antenna j to an Rx antenna i is denoted by $h_{ij}$. It should be noted that the index order of the channel $h_{ij}$ is located before a reception (Rx) antenna index and is located after a transmission (Tx) antenna index.

FIG. 5(b) illustrates channels from $N_T$ Tx antennas to an Rx antenna i. The channels may be collectively represented in the form of vector and matrix. Referring to FIG. 5(b), the channels passing the range from the $N_T$ Tx antennas to the Rx antenna i can be represented by the Equation 7 below.

$$h_i^T=[h_{i1}, h_{i2}, \ldots, h_{iN_T}] \qquad \text{[Equation 7]}$$

All channels passing the range from the $N_T$ Tx antennas to $N_R$ Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad \text{[Equation 8]}$$

Additive white Gaussian noise (AWGN) is added to an actual channel which has passed the channel matrix. The AWGN ($n_1, n_2, \ldots, n_{N_R}$) added to each of $N_R$ reception (Rx) antennas can be represented by Equation 9 below.

$$n=[n_1, n_2, \ldots, n_{N_R}]^T \qquad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx+n$$

The number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communications system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communications system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
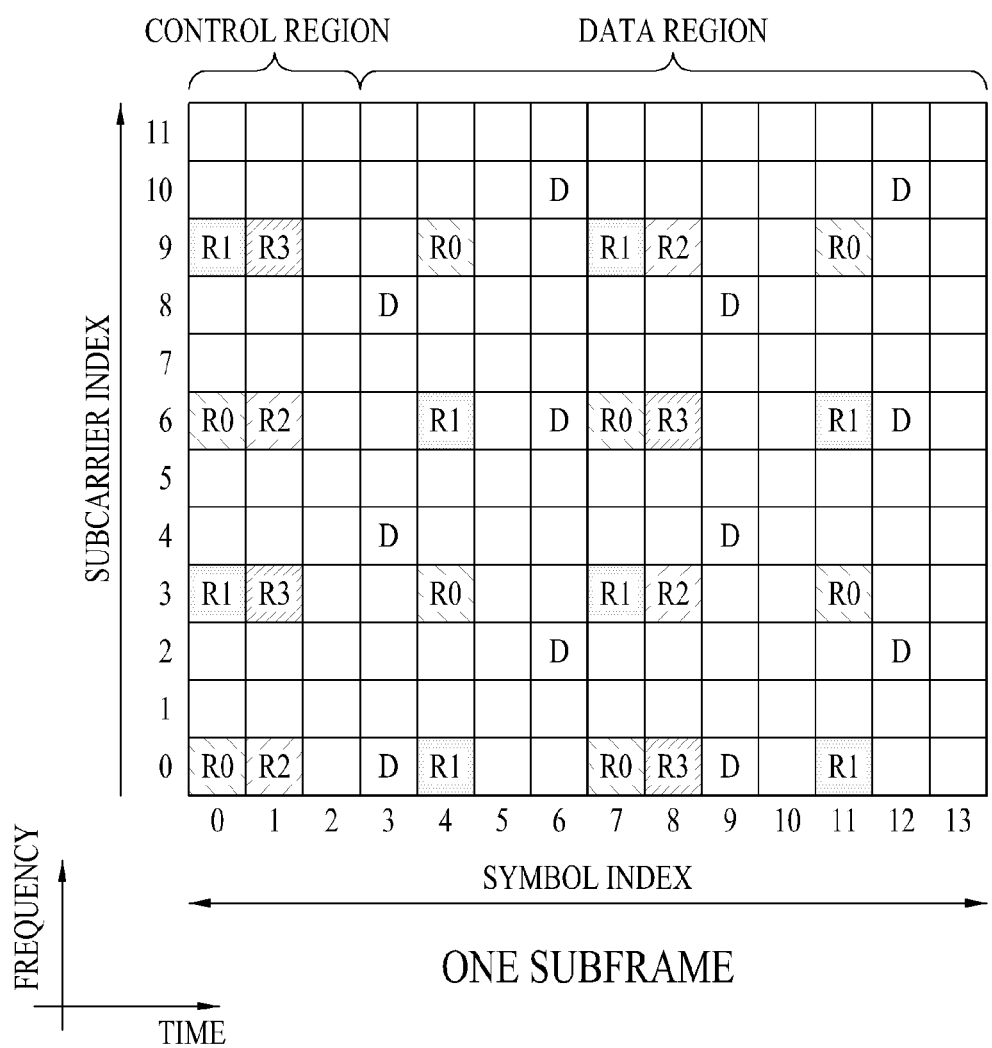
FIG. 6 illustrates patterns of conventional CRS and DRS.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRS s defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
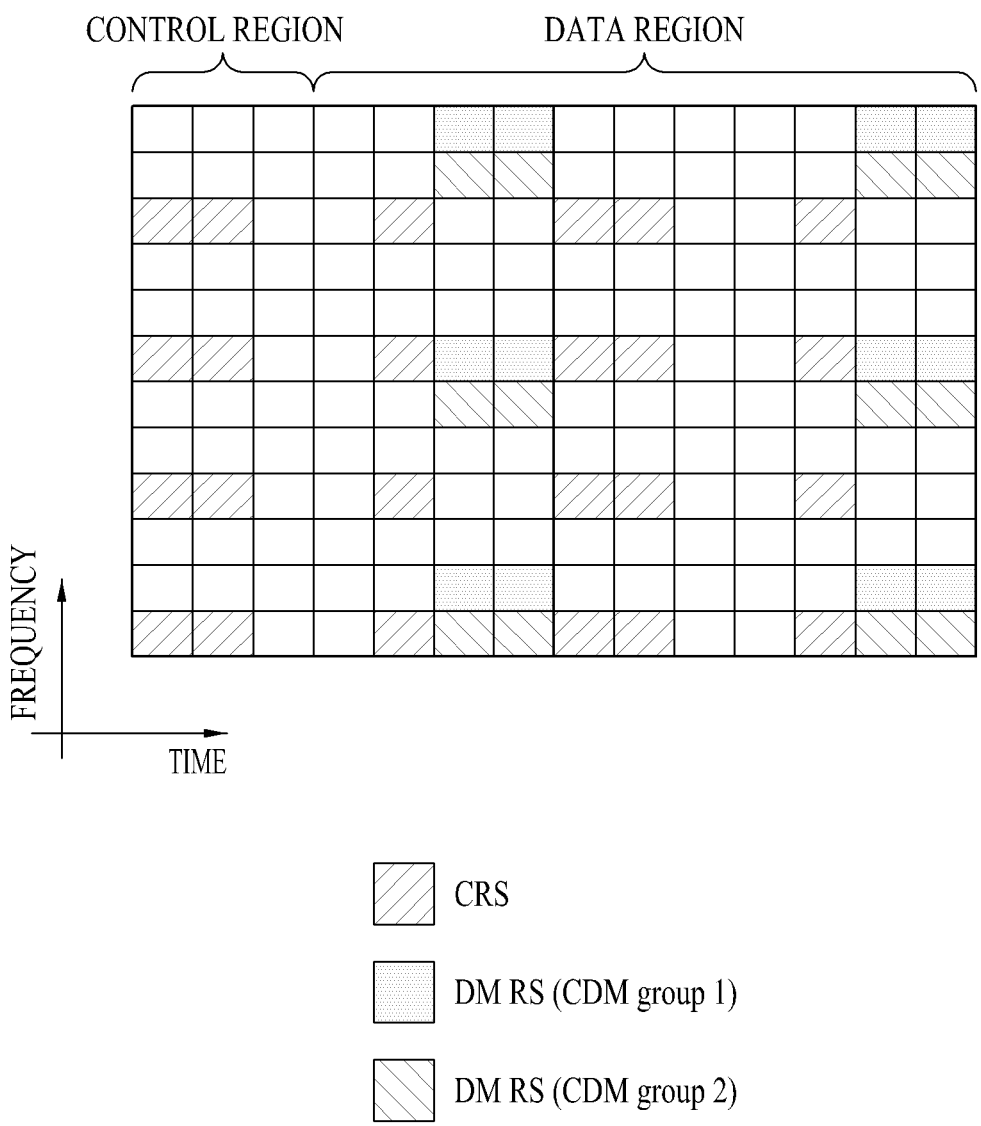
FIG. 7 illustrates an example of a DM RS pattern.

FIG. 7 illustrates an example of a DM RS pattern, which is defined in the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
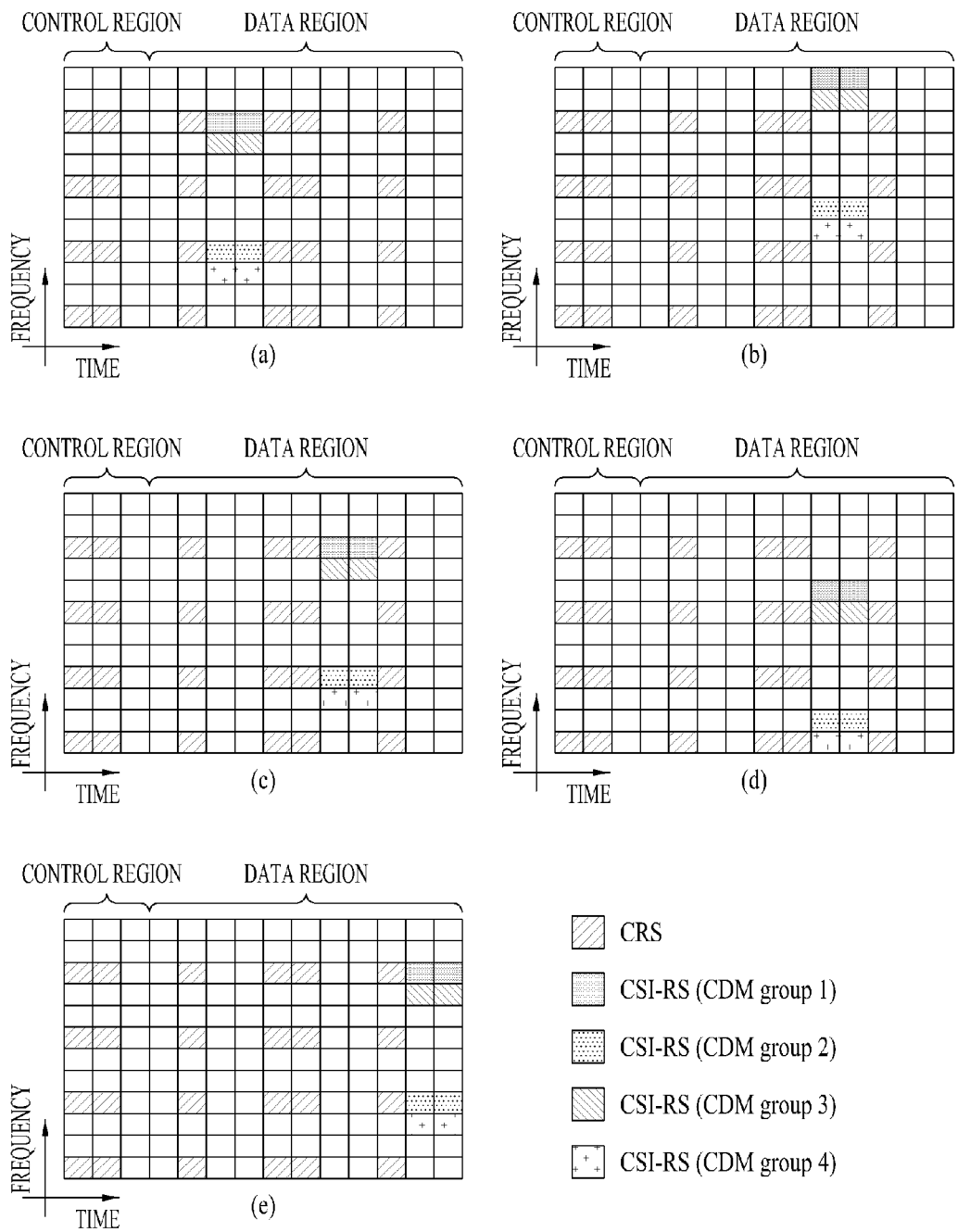
FIG. 8 illustrates examples of CSI-RS patterns.

FIG. 8 illustrates examples of CSI-RS patterns, which are defined in the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The PS patterns of FIGS. 6 to 8 are merely exemplary, and, therefore, in applying diverse exemplary embodiments of the present invention, the RS patterns will not be limited only specific RS patterns. More specifically, even in cases when RS patterns that are different from those shown in FIGS. 6 to 8 are defined and used, the diverse exemplary embodiments of the present invention may be equally applied.

CSI-RS Configuration

In the LTE system, in order to perform channel measurement, CSI-RS may be used. One user equipment (UE) may receive multiple CSI-RS configurations, and, at this point, each CSI-RS has an independent configuration. More specifically, each CSI-RS is configured of an independent cycle period and offset, resource configuration, power control (Pc), and number of antenna ports, and information related to CSI-RS is signaled to the UE from the base station through higher layer signaling (RRC, and so on).

Among the multiple CSI-RSs and multiple IMRs (interference measurement resources) configured to the UE, one CSI-RS resource for signal measuring and one CSI process that is associated with one IMR for interference measurement may be defined. The UE feeds back CSI information, which is derived from different CSI processes, to the network (e.g., base station) at an independent cycle period and subframe offset.

More specifically, each CSI process has an independent CSI feedback configuration. Such CSI-RS resource and IMR resource association information and CSI feedback configurations may be notified to the UE by the base station via higher layer signaling, such as RRC, and so on, with respect to each CSI process. For example, the UE assumes that the UE receives the configuration of three CSI processes, as shown below in Table 1.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 respectively represent a CSI-RS that is received from Cell 1, which corresponds to a serving cell of the UE, and a CSI-RS that is received from Cell 2, which corresponds to a neighboring cell participating in the cooperation. In case it is assumed that the IMRs configured with respect to each of the CSI processes shown in Table 1 are configured as shown below in Table 2,

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

In IMR 0, Cell 1 is set to perform muting, and Cell 2 is set to perform data transmission, and the UE is configured to measure interference caused by other cells excluding Cell 1 from IMR 0. Similarly, in IMR 1, Cell 2 is set to perform muting, and Cell 1 is set to perform data transmission, and the UE is configured to measure interference caused by other cells excluding Cell 2 from IMR 1. Additionally, in IMR 2, Cell 1 and Cell 2 may both be set to perform muting, and the UE is configured to measure interference caused by other cells excluding Cell 1 and Cell 2 from IMR 2.

Accordingly, as shown in Table 1 and Table 2, in case of receiving data from Cell 1, the CSI information of CSI process 0 indicates optimal RI, PMI, CQI information. In case of receiving data from Cell 2, the CSI information of CSI process 1 indicates optimal RI, PMI, CQI information. In case of receiving data from Cell 1 and receiving no interference from Cell 2, the CSI information of CSI process 2 indicates optimal RI, PMI, CQI information.

The base station may configure a cycle period (or interval) or pattern according to which the CSI-RS is being transmitted. In order to measure the CSI-Rs, the user equipment (UE) is required to be aware of the CSI-RS configuration respective to each CSI-RS antenna port of the cell to which the UE belongs. A downlink subframe index through which the CSI-RS is being transmitted, a time-frequency position of a CSI-RS resource element (RE) within a transport subframe (e.g., CSI-RS patterns shown in FIG. 8(a) to FIG. 8(e)), a CSI-RS sequence (as a sequence that is used for the purpose of a CSI-RS, this sequence may be generated pseudo-randomly in accordance with a predetermined rule based upon a slot number, a cell ID, a CP length, and so on), and so on, may be included in the CSI-RS configuration. More specifically, multiple CSI-RS configurations may be used by a given base station, and, among the multiple CSI-RS configurations, the base station may notify CSI-RS configurations that are to be used with respect the UE(s) existing within the cell.

Additionally, since the CSI-RS respective to each antenna port is required to be differentiated from one another, the resource through the CSI-RS respective to each antenna port is transmitted shall be orthogonal to one another. As described above with respect to FIG. 8, the CSI-RS configurations respective to each antenna port may be multiplexed by using FDM, TDM, and/or CDM schemes (or methods) by using orthogonal frequency resources, orthogonal time resources, and/or orthogonal code resources.

When the base station notifies information on CSI-RS (CSI-RS configuration) to the user equipments within the cell, the base station shall first notify information on the time-frequency to which the CSI-RS respective to each antenna port is being mapped. More specifically, subframe numbers through which the CSI-RS is being transmitted, a cycle period (or interval) according to which the CSI-RS is being transmitted, a subframe offset through which the CSI-RS is being transmitted, an OFDM symbol number through which a CSI-RS resource element (RE) of a specific antenna is being transmitted, and so on, may be included in the information on the time. A frequency spacing (or interval) through which the CSI-RS resource element (RE) of a specific antenna is being transmitted, an offset or shift value of an RE in a frequency axis, and so on, may be included in the information on the frequency.

Figure 9:
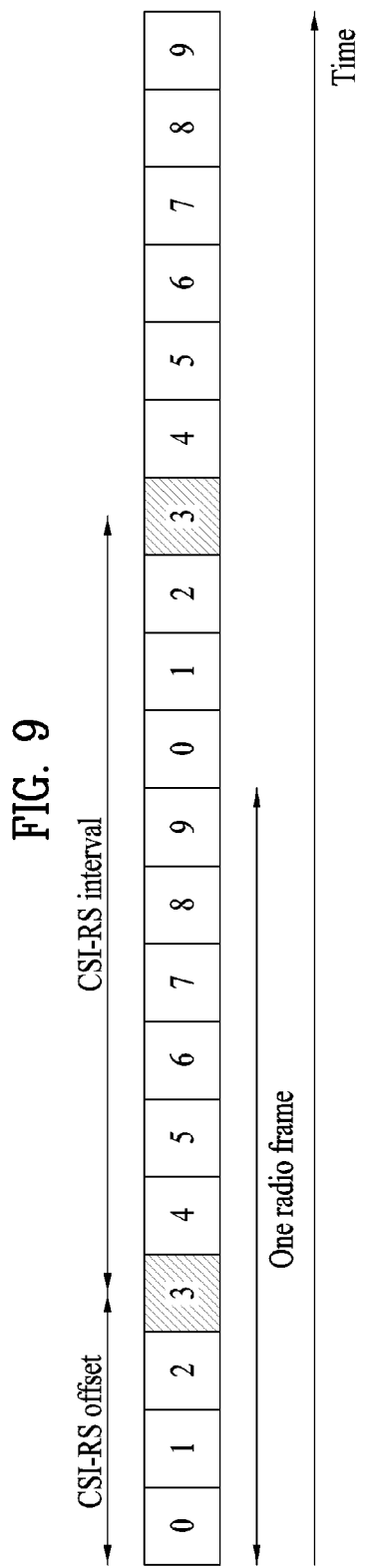
FIG. 9 illustrates an exemplary method of periodically transmitting the CSI-RS.

FIG. 9 illustrates an exemplary method of periodically transmitting the CSI-RS. The CSI-RS may be periodically transmitted at an interval (or cycle period) of a multiple of one subframe (e.g., a 5 subframe interval, a 10 subframe interval, a 20 subframe interval, a 40 subframe interval, or a 80 subframe interval).

It is shown in FIG. 9 that one radio frame is configured of 10 subframes (Subframe numbers 0 to 9). For example, FIG. 9 illustrates a case when the transmission interval (or cycle period) of the CSI-RS of the base station corresponds to 10 ms (i.e., 10 subframes), and when the CSI-RS transmission offset is equal to 3. In order to allow the CSI-RS of multiple cells to be evenly distributed in time, the offset value may be given a different value for each base station. In case the CSI-RS is being transmitted at an interval of 10 ms, the offset value may be given a value corresponding to one of 0~9. Similarly, in case the CSI-RS is being transmitted at an interval of 5 ms, the offset value may be given a value corresponding to one of 0~4, and, in case the CSI-RS is being transmitted at an interval of 20 ms, the offset value may be given a value corresponding to one of 0~19, and, in case the CSI-RS is being transmitted at an interval of 40 ms, the offset value may be given a value corresponding to one of 0~39, and, in case the CSI-RS is being transmitted at an interval of 80 ms, the offset value may be given a value corresponding to one of 0~79. This offset value represents the value of a subframe from which the base station starts to perform CSI-RS transmission, wherein the base station transmits the CSI-RS at a predetermined interval. When the base station notifies the transmission interval (or cycle period) and the offset value, the user equipment (UE) may receive the CSI-RS of the base station from the corresponding subframe position by using the notified values. The user equipment may measure the channel through the received CSI-RS, and, then, as the measurement result, the user equipment may report information, such as CQI, PMI, and/or RI (Rank Indicator), to the base station. In this document, with the exception for the case of describing the terms CQI, PMI, and RI, these terms may be collectively referred to as CQI (or CSI). Additionally, the CSI transmission interval and offset may be separately designated for each CSI-RS configuration.

Figure 10:
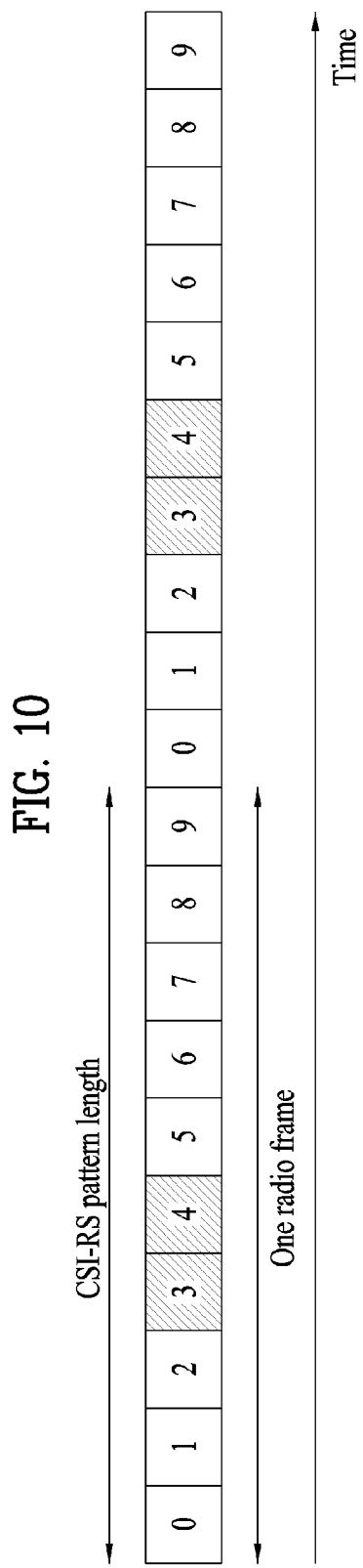
FIG. 10 illustrates an exemplary method of aperiodically transmitting the CSI-RS.

FIG. 10 illustrates an exemplary method of aperiodically transmitting the CSI-RS. It is shown in FIG. 10 that one radio frame is configured of 10 subframes (Subframe numbers 0 to 9). As shown in FIG. 10, a subframe through which the CSI-RS is being transmitted may be represented by a specific pattern. For example, a CSI-RS transmission pattern may be configured in units of 10 subframes, and whether or not the CSI-RS is being transmitted in each of the subframes may be designated by a 1-bit indicator. The example of FIG. 10 shows a CSI-RS pattern, which is being transmitted from subframe indexes 3 and 4 within 10 subframes (Subframe numbers 0 to 9). Such indicator may be provided to the user equipment via higher layer signaling.

As described above, the configuration respective to CSI-RS transmission may be diversely configured, and, in order to allow the user equipment (UE) to correctly (or properly) receive the CSI-RS and perform channel measurement, the base station is required to notify the UE of the CSI-RS configuration. Various exemplary embodiments of the present invention for notifying the CSI-RS configuration to the user equipment will hereinafter be described in detail.

Method for Notifying CSI-RS Configuration

Generally, the following two methods may be considered as a method of a base station for notifying CSI-RS configuration to the user equipment (UE).

The first method corresponds to a method of a base station for broadcasting information related to CSI-RS configuration to the user equipments by using Dynamic Broadcast Channel (DBCH) signaling.

In the conventional (or legacy) LTE system, when the base station notifies content on system information to the user equipments, generally, the base station may transmit the corresponding information through a BCH (Broadcasting Channel). In case the content of the system information that is to be notified to the user equipment is too large, and, accordingly, if the base station cannot transmit all of the content by only using the BCH, the base station transmits the system information by using the same method for transmitting general downlink data. However, the base station may transmit the system information by masking a PDCCH CRC of the corresponding data by using a system information identifier (SI-RNTI) instead of a specific user equipment identifier (e.g., C-RNTI). In this case, the actual system information is transmitted over a PDSCH region just like general unicast data. Accordingly, after using the PDCCH by using the SI-RNTI, all of the user equipments within the cell may acquire system information by decoding the PDSCH, which is indicated (or designated) by the PDCCH. The above-described broadcasting method may also be referred to as DBCH (Dynamic BCH) in order to be differentiated from the PBCH (Physical BCH), which corresponds to a general broadcasting method.

Meanwhile, the system information that is being broadcasted in the conventional (or legacy) LTE system may be broadly divided into two different types. One of the two types corresponds to a MIB (Master Information Block), which is transmitted through the PBCH, and another one of the two types corresponds to a SIB (System Information Block), which is multiplexed with unicast data and transmitted over the PDSCH region. Since the conventional LTE system defines information being transmitted as SIB Type 1 to SIB Type 8 (SIB1 to SIB8), a new SIB type may be defined for information on the CSI-RS configuration, which corresponds to a new type of system information that is not defined in the conventional SIB type. For example, SIB9 or SIB10 may be defined, and the base station may notify information on the CSI-RS configuration to the user equipments within the cell by using the DBCH method through the newly defined SIB9 or SIB10.

The second method corresponds to a method of a base station for notifying information related to CSI-RS configuration to each of the user equipments by using RRC (Radio Resource Control) signaling. More specifically, information on CSI-RS configuration may be provided to each of the user equipments within the cell by using dedicated RRC signaling. For example, during a process when the user equipment establishes connection with the base station through an initial access or handover, the base station may notify the corresponding user equipment of the CSI-RS configuration via RRC signaling. Alternatively, when the base station transmits a RRC signaling message requesting for a channel status feedback based upon a CSI-RS measurement to the user equipment, the base station may also notify the CSI-RS configuration to the corresponding user equipment through the corresponding RRC signaling message.

PRB Bundling

PRB bundling refers to applying the same PMI throughout multiple neighboring resource blocks when transmitting data. In other words, the user equipment assumes multiple resource blocks within a frequency domain as a single granularity for precoding in order to perform PMI/RI reporting.

A system bandwidth is divided into a Fixed system bandwidth in accordance with a size P' of a Precoding Resource Block Group (PRG), and each of the PRGs is configured of consecutive PRBs. If $N_{RB}^{DL}$ modP'>0, the size of one PRG among the Precoding Resource Block Groups (PRGs) is equal to $N_{RB}^{DL} - P'\lfloor N_{RB}^{DL}/P' \rfloor$.

An exemplary size of a PRG that is assumed by the user equipment in the LTE system will hereinafter be described with reference to Table 3. In the LTE system, a PRG size that is assumed by the user equipment with respect to a given system bandwidth may be defined as shown below in Table 3.

TABLE 3

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

For example, in case the predetermined downlink bandwidth ($N_{RB}^{DL}$) is equal to 25, the size of a PRG is defined as 2, as shown in Table 3. Accordingly, when performing PRB bundling, among the PRGs, one PRG is configured of 1 PRB. More specifically, the system bandwidth is divided into 13 PRGs, wherein the 13 PRGs include 12 PRGs each being configured of 2 PRBs and 1 PRG being configured of 1 PRB. At this point, it may be assumed that the user equipment (UE) can apply the same precoder to all of the scheduled PRBs belonging to a single PRG.

Interference Rejection Combining Using PRB Bundling

As a method for effectively removing (or eliminating) reception interference an interference rejection combining (IRC) method may be used. For example, by coordinating PRB bundling between neighboring cells, the UE may increase accuracy in channel covariance estimation of signals and interference and may also enhance performance of an IRC receiver.

However, the distribution of a data size being received by the UE may statistically vary for each cell. Accordingly, the operation of coordinating the PRB bundling between neighboring cells may lead to a waste of resource.

Figure 11:
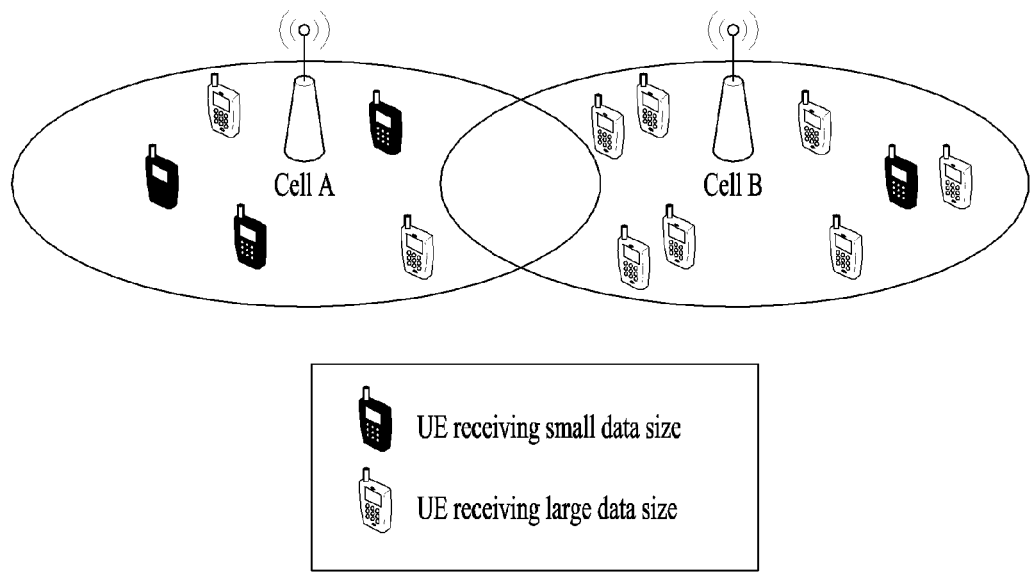
FIG. 11 illustrates a block view showing a structure of a system to which the exemplary embodiment of the present invention can be applied.

For example, an environment to which an exemplary embodiment of the present invention can be applied, as shown in FIG. 11, may be considered. Referring to FIG. 11, UEs receiving a small data size and UEs receiving a large data size in two neighboring cells A and B are distributed at different distributions. Although more than a majority of the UEs receive a small data size in Cell A, most of the UEs receive a large data size in Cell B. For example, in case a UE transmits/receives voice data via VoIP, the UE may belong to the UE group receiving a small data size.

Herein, if Cell A and Cell B perform the same PRB bundling in order to enhance the performance of the IRC receiver, this may lead to a waste of resources in Cell A. Since most of the UEs of Cell A have a small data size, scheduling may be performed on one PRB. However, with the application of PRB bundling, scheduling has been performed on a plurality of PRBs. As a result, resources that are to be scheduled to UEs receiving a large data size may become insufficient in Cell A.

First Embodiment

In order to resolve the above-described problem, according to the first exemplary embodiment of the present invention, a resource restricted PRB bundling coordination may be performed.

Figure 12:
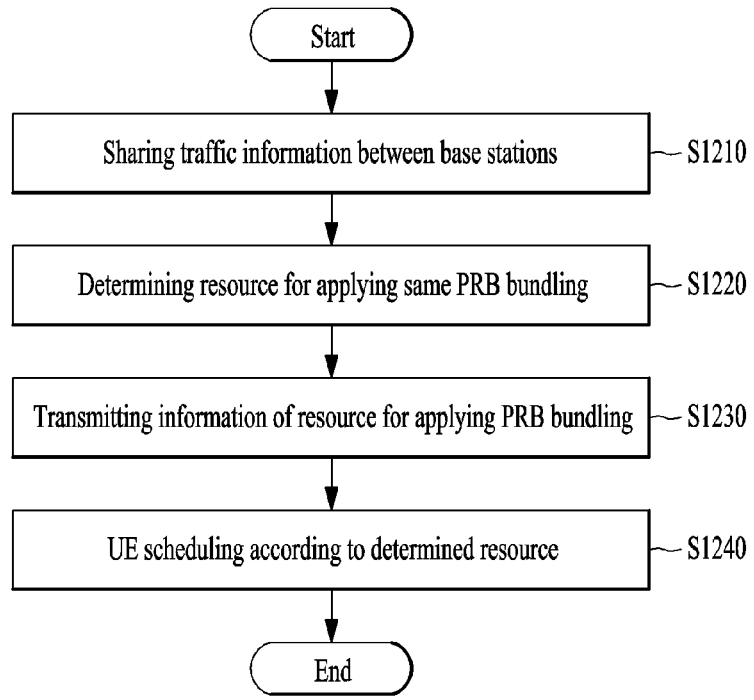
FIG. 12 illustrates a flow chart of a method according to the first exemplary embodiment of the present invention.

FIG. 12 illustrates a flow chart of a method according to the first exemplary embodiment of the present invention.

Referring to FIG. 12, traffic information is first shared among base stations (S1210).

For simplicity in the description, cells that coordinate PRB bundling with among one another are referred to as BCC (bundling cooperation cells). Each cell belonging to the BCC shares a data size distribution of a UE, which is scheduled by the respective cell.

For example, among the downlink traffic data of each cell, each cell estimates a traffic size that can be transmitted through a single PRB and a traffic size that is to be transmitted through multiple PRBs, and, then, each cell shares the estimated traffic sizes with other cells within the BCC. Alternatively, each cell estimates a traffic size that is transmitted without performing PRB bundling and a traffic size that is transmitted after performing PRB bundling, among its own downlink data traffic, and, then, each cell shares the estimated traffic sizes with other cells within the BCC.

For simplicity in the description, in this specification, a ratio between the traffic size that is to be transmitted through multiple PRBs and the traffic size that can be transmitted through a single PRB within each cell or a ratio between the traffic size that is transmitted after performing PRB bundling and the traffic size that is transmitted without performing PRB bundling will be referred to as a bundling ratio (BR).

In FIG. 11, in case Cells A and B correspond to BCC, the BRs of cells A and B may become a:(1-a) and b:(1-b). ($0 \leq a, b \leq 1$) If traffic occurs at intervals, resource utilization (RU) information of each cell is shared along with the above-described information.

Referring back to FIG. 12, the base station configures resources to which the same PRB bundling is to be applied (S1220)

If UE traffic information (e.g., BR information) of each cell included in the BCC is shared, the network decides the resources to which the same PRB bundling is to be applied among the entire frequency time resources. The resources to which the same PRB bundling is to be applied may correspond to a specific subframe or a specific frequency domain.

In the example of FIG. 11, in case the BRs of Cells A and B respectively correspond to a:(1-a) and b:(1-b), resources to which the same PRB bundling is to be applied may be decided based upon the minimum value of a and b.

More specifically, in case a=0.5 and b=0.7, the minimum value corresponds to 0.5, and, accordingly, when it is assumed that the entire frequency time resource is equal to 1, the BCCs will agree to perform PRB bundling on half of the resources.

For example, BCCs shall agree to perform the same PRB bundling in an even-numbered (or even-indexed) subframe, and each cell shall agree to perform independent PRB bundling in an odd-numbered (or odd-indexed) subframe. In this case, each cell within the odd-numbered subframe may apply PRB bundling separately from other cells or may apply different precoding in single PRB units.

Alternatively, when it is assumed that the system corresponds to a 50 RB (=10 MHz) system, it shall be predetermined that bundling is performed in units of 3 PRBs starting from the first PRB to the $24^{th}$ PRB, and it shall be agreed that each cell independently decides PRB bundling with respect to the remaining PRBs.

Meanwhile, the operations of step S1210 and step S1230 signify signaling between base stations that are required for PRB bundling coordination. At this point, one base station belonging to the BCC may oversee PRB bundling coordination by collecting traffic information, or each of the base stations belonging to the BCC may perform PRB bundling coordination in accordance with a predetermined rule by equally broadcasting its own traffic information.

A case when one base station belonging to the BCC oversees PRB bundling coordination is as described below. In the example of FIG. 11, in order to oversee PRB bundling coordination, Cell A collects the traffic information of Cell B and determines (or sets up) the resources to which the same PRB bundling is to be applied, and, then, Cell A may transmit the determined resource information to Cell B.

Conversely, all of the base stations belonging to the BCC may equally oversee PRB bundling coordination.

In the example of FIG. 11, each of Cell A and Cell B may broadcast its own traffic information via Backhaul link, and, then, a cell that has received the traffic information of a neighboring cell, which belongs to the BCC, from such broadcasting performs PRB bundling coordination in accordance with a predetermined rule.

For example, hereinafter, it will be assumed that two cells have been predetermined to perform PRB bundling starting from a low-numbered (or low-indexed) subframe, and, it will also be assumed that Cell A has broadcasted BR information 0.5:0.5 to B and that Cell B has broadcasted BR information 0.7:0.3 to Cell A. In this case, Cell A transmits data to which PRB bundling is applied to the lower five subframes among 10 subframes, and Cell A is aware that Cell B transmits data to which PRB bundling is applied to the lower seven subframes among 10 subframes. Accordingly, Cell A becomes aware of the fact that the same PRB bundling between BCCs has been applied in the lower five subframes among the 10 subframes. And, similarly, Cell B transmits data to which PRB bundling is applied to the lower seven subframes among the 10 subframes and becomes aware that Cell A transmits data to which the PRB bundling is applied to the lower five subframes among the 10 subframes. Accordingly, Cell B becomes aware of the fact that the same PRB bundling between BCCs has been applied in the lower five subframes.

As another example, BR information may be shared between base stations by using a bit map method. When a 10 bit bitmap is used with respect to the entire 10 subframes, by setting the $i^{th}$ bit to 1, this may correspond to an indication that PRB bundling is being applied to the $i^{th}$ subframe ($0 \leq i \leq 9$). Cell A broadcasts bitmap 1111100000 to B, and Cell B broadcasts bitmap 1111111000 to A. And, accordingly, by processing a logical product (and) operation between its own bitmap and the bitmap of its neighboring cell, each of Cells A and B may become aware of the fact that the same PRB bundling between BCCs has been applied to the lower five subframes.

Referring back to FIG. 12, the base station transmits resource information to which the same PRB bundling is to be applied to the UE (S1230).

After deciding a PRB (frequency), a subframe (time), or a combination of the two to which the same PRB bundling is to be applied, the base station semi statically notifies the corresponding resource information to the UE via higher layer signaling (e.g., RRC signaling).

Alternatively, the base station dynamically notifies the corresponding resource information to the UE via DCI. In case of notifying via DCI, information on whether or not PRB bundling between BCCs is coordinated with respect to the currently scheduled data may be notified in the form of bitmap or flag bit.

For example, if the same PRB bundling between BCCs is applied to an even-numbered subframe, when receiving data from the even-numbered subframe, the UE may gain a more enhanced IRC receiver performance. The UE performing DMRS based IRC first demodulates the data via DMRS from the even-numbered subframe, and, thereafter, the UE re-generates a reception desired signal from the demodulated signal, thereby subtracting the desired signal from the received signal. As a result, the UE gains a signal that is configured only of interference and noise. At this point, since the interference signal between the cells within the BCC is processed with PRB bundling in the same unit as that of PRB bundling of the DMRS, a valid interference channel between the cells within the BCC within the bundled PRB may be considered to be static. (Herein, a valid interference channel signifies a channel corresponding to an interference channel having an interference precoder applied thereto.) As a result, the UE may estimate a more accurate interference covariance matrix by using a larger number of valid interference channel samples existing within the bundled PRB.

As another example, if the same PRB bundling between BCCs is applied in frequency resource units, when receiving data from the frequency resource to which the same PRB bundling is applied, the UE may gain a more enhanced IRC receiver performance. When it is assumed that the system corresponds to a 50 RB (10 MHz) system, the BCC shall agree that bundling is performed in units of 3 PRBs starting from the first PRB to the $24^{th}$ PRB, and the BCC shall agree that each cell independently decides PRB bundling with respect to the remaining PRBs. In case the UE performing DMRS based IRC receives data from a frequency resource, which exists within the first PRB and the $24^{th}$ PRB, since the interference signal of the BCC is processed with PRB bundling in the same unit as that of PRB bundling of the DMRS, a valid interference channel of the BCC within the bundled PRB may be considered to be static. (Herein, a valid interference channel signifies a channel corresponding to an interference channel having an interference precoder applied thereto.) As a result, the UE may estimate a more accurate interference covariance matrix by using a larger number of valid interference channel samples existing within the bundled PRB.

Meanwhile, instead of notifying resource information to which the same PRB bundling is being applied between the cells within the BCC, among the resources being used by the neighboring cell, the serving cell may also notify information on the resources to which PRB bundling is applied to the UE. Based upon such information, upon receiving the data, when the UE determines that the interference cell has performed PRB bundling, when estimating the interference channel, the UE may increase accuracy in channel estimation of the interference cell by using PRB bundling. If the serving cell is aware of the resource information to which PRB bundling is applied in a neighboring cell, the serving cell may semi statically notify the known resource information to the UE via RRC signaling. Additionally, the information may be transmitted to the UE not only by the serving cell but also by a neighboring cell.

For example, as described above, when BR information is shared between base stations by using a bit map method, and when it is assumed that Cell A broadcasts bitmap 1111100000 to B and that Cell B broadcasts bitmap 1111111000 to A, Cell A notifies the bitmap information 1111111000 of Cell B to its own UE. When the UE has received its data between the $0^{th}$ subframe and the $7^{th}$ subframe, the UE may consider a valid interference channel of the BCC within the PRB, which is grouped by PRB bundling, to be static, and, then, the UE may estimate a more accurate interference covariance matrix.

As another example, it will be assumed that two cells have agreed in advance to perform PRB bundling starting from a low-numbered (or low-indexed) subframe, and, it will also be assumed that Cell A has broadcasted BR information 0.5:0.5 to B and that Cell B has broadcasted BR information 0.7:0.3 to Cell A. At this point, Cell A notifies the BR information of Cell B to its own UE. After receiving its data between the $0^{th}$ subframe and the $7^{th}$ subframe, the UE may consider a valid interference channel of the BCC within the PRB, which is grouped by PRB bundling, to be static, and, then, the UE may estimate a more accurate interference covariance matrix.

Additionally, if the serving cell is aware of the resource information to which the PRB bundling is to be applied in a neighboring cell belonging to the BCC, the serving cell may dynamically notify the corresponding resource information to the UE. For example, among the PDSCH resources that are being transmitted to a specific UE, a position and bundling size having PRB bundling applied thereto of a neighboring cell are notified to the UE. Alternatively, and more simply, it may be agreed that PRB bundling is fixed to being applied sequentially starting from the PDSCH resource that is being transmitted to the UE, and that the bundling size is also fixed in accordance with the bandwidth of its own cell. In this case, information on whether or not interference PRB bundling is performed on the PDSCH is notified to the UE through a 1 bit flag.

Subsequently, the base station schedules the UE in accordance with the predetermined resource area (S1240).

After performing the above-described procedures, the base station performs UE scheduling by distinguishing the resources to which the same PRB bundling is to be applied from the remaining resources.

Second Embodiment

The second exemplary embodiment of the present invention represents resource restricted resource allocation type coordination.

FIG. 13 illustrates a flow chart of a method according to the second exemplary embodiment of the present invention.

The first exemplary embodiment of the present invention has enhanced the IRC receiver performance by coordinating PRB bundling in a specific resource between base stations. According to the second exemplary embodiment of the present invention, in addition to PRB bundling, by agreeing to perform scheduling by using resource allocation type 0 in a specific resource between base stations, the IRC receiver performance may be enhanced. According to the second exemplary embodiment of the present invention, in steps S1210 and S1220 of the first exemplary embodiment, coordination is realized with respect to Resource allocation type 0 instead of PRB bundling.

As a subject performing the second exemplary embodiment of the present invention, one base station belonging to the BCC may oversee Resource allocation type coordination by collecting traffic information, or each of the base stations belonging to the BCC may perform Resource allocation type coordination in accordance with a predetermined rule by equally broadcasting its own traffic information.

First of all, a case when one base station belonging to the BCC oversees Resource allocation type coordination will hereinafter be described.

In the example of FIG. 11, in order to oversee Resource allocation type coordination, Cell A collects the traffic information of Cell B and determines (or sets up) the resources to which the same Resource allocation type is to be applied, and, then, Cell A may transmit the determined resource information to Cell B.

Subsequently, all of the base stations belonging to the BCC may equally oversee Resource allocation type coordination.

In this case, in the example of FIG. 11, each of Cell A and Cell B may broadcast its own traffic information via Backhaul link, and, then, a cell that has received the traffic information of a neighboring cell, which belongs to the BCC, from such broadcasting performs Resource allocation type coordination in accordance with a predetermined rule.

For example, hereinafter, it will be assumed that two cells have been predetermined in advance to perform Resource allocation type 0 starting from a low-numbered (or low-indexed) subframe, and, it will also be assumed that Cell A has broadcasted BR information 0.5:0.5 to B and that Cell B has broadcasted BR information 0.7:0.3 to Cell A. Cell A transmits data to which Resource allocation type 0 is applied to the lower five subframes among 10 subframes, and Cell A is aware that Cell B transmits data to which Resource allocation type 0 is applied to the lower seven subframes among 10 subframes. Accordingly, Cell A may become aware of the fact that the same Resource allocation type 0 between BCCs has been equally applied in the lower five subframes among the 10 subframes. And, similarly, Cell B transmits data to which Resource allocation type 0 is applied to the lower seven subframes among the 10 subframes and becomes aware that Cell A transmits data to which the Resource allocation type 0 is applied to the lower five subframes among the 10 subframes. Accordingly, Cell B becomes aware of the fact that the same Resource allocation type 0 between BCCs has been equally applied in the lower five subframes.

As another example, BR information may be shared between base stations by using a bit map method. When a 10 bit bitmap is used with respect to the entire 10 subframes, by setting the $i^{th}$ bit to 1, this may correspond to an indication that Resource allocation type 0 is being applied to the $i^{th}$ subframe ($0 \leq i \leq 9$). Cell A broadcasts bitmap 1111100000 to B, and Cell B broadcasts bitmap 1111111000 to A. And, accordingly, by processing a logical product (and) operation between its own bitmap and the bitmap of its neighboring cell, each of Cells A and B may become aware of the fact that the same Resource allocation type 0 between BCCs has been applied to the lower five subframes.

In case of the Resource allocation type 0, PDSCH scheduling is performed in RGB units, and, herein, cells that belong to the BCC perform PDSCH scheduling by always using Resource allocation type 0 in a specific resource and perform PDSCH scheduling by using a random Resource allocation type in the remaining resources. The base station transmits the specific resource information in which scheduling is restricted (or limited) to the Resource allocation type 0 to the UE via RRC or DCI. In case of receiving the PDSCH in the specific resource, the UE assumes that the PDSCH, the DMRS, and the interference received from the BCC are all bundled in the same size by PRB bundling and, then, enhances the IRC receiver performance by performing step S1230 of the above described exemplary embodiment.

Meanwhile, if the serving cell is aware of the resource information to which the Resource allocation type 0 is to be applied in the neighboring cell, which belongs to the BCC, the serving cell may notify the resource information to the UE via RRC signaling or DCI. By using the same method, which is described above in the first exemplary embodiment, the UE enhances the IRC receiver performance by using the resource information to which the Resource allocation type 0 is to be applied in the neighboring cell. Additionally, the information to which the Resource allocation type 0 is to be applied may be transmitted to the UE not only by the serving cell but also by the neighboring cell.

Third Embodiment

The above-described first and second exemplary embodiments have been described based upon the fact that the bandwidths of the cell belonging to the BCC are the same. However, in case the bandwidth of each cell is different from one another, more specifically, even in case the PRB bundling size of each cell is configured to be different from one another, the above-described first and second exemplary embodiments may be extendedly applied.

For example, in FIG. 11, when Cells A and B are respectively assigned with bandwidths of 10 MHz and 20 MHz, according to the current LTE specification, the PRB bundling sizes are determined to be different from one another. At this point, each of Cell A and Cell B is respectively applied with bundling in units of 3 RPB and 2PRB.

As described above, in case the PRB bundling size is determined differently for each cell of the BCC, PRB bundling coordination may be performed based upon the lowest value among the PRB bundling sizes of each cell.

Conversely, PRB bundling coordination may be performed based upon the highest value among the PRB bundling sizes of each cell.

Alternatively, in order to prevent such problems from occurring in advance, restrictions (or limitations) may be made so that only the cells having the same PRB bundling size can be configured as the BCC.

Similarly, in case of the resource type coordination, if the RGB size of each cell is configured differently, this may be resolved by using the above-described methods. More specifically, resource allocation type allocation may be performed based upon the lowest value or the highest value among the RGB sizes of each cell.

FIG. 14 illustrates a base station and a user equipment that can be applied to an exemplary embodiment of the present invention.

In case a relay is included in a wireless communications system, in a backhaul link, communication is established between the base station and the relay, and, in an access link, communication is established between the relay and the user equipment. Therefore, the base station or the user equipment, which are presented as examples in the drawing, may be replaced with the relay in accordance with the corresponding circumstances.

Referring to FIG. 14, a wireless communication device includes a base station (1410) and a user equipment (1420). The base station (1410) includes a processor (1413), a memory (1414), and a Radio Frequency (RF) unit (1411, 1412). The processor (1413) may be configured to realize the procedures and/or methods, which are proposed in the present invention. The memory (1414) is connected to the processor (1413) and stores diverse information related to the operations of the processor (1413). The RF unit (1411, 1412) is connected to the processor (1413) and transmits and/or receives radio signals. The user equipment (1420) includes a processor (1423), a memory (1424), and a RF unit (1421, 1422). The processor (1423) may be configured to realize the procedures and/or methods, which are proposed in the present invention. The memory (1424) is connected to the processor (1423) and stores diverse information related to the operations of the processor (1423). The RF unit (1421, 1422) is connected to the processor (1423) and transmits and/or receives radio signals. The base station (1410) and/or the user equipment (1420) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In this document, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term base station may be replaced by other terms, such as fixed station, Node B, eNode B (eNB), access point, and so on.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor.

The memory may be located inside or outside of the processor, and the memory unit may transmit and receive data to and from the processor by using a wide range of methods that have already been disclosed.

As described above, a detailed description of the preferred mode for carrying out the present invention disclosed herein is provided so that anyone skilled in the art can be capable of realizing and performing the present invention. Although the description provided above is described with reference to the preferred mode for carrying out the present invention, it will be apparent to those skilled in the art that the present invention may be diversely corrected and modified without departing from the spirit and scope of the present invention, which are disclosed in the appended claims of the present invention disclosed below. Therefore, the present invention will not be limited only to the exemplary embodiments disclosed herein. For example, anyone skilled in the art may use a method of combining each component mentioned in the above-described exemplary embodiments. Instead, the present invention seeks to provide a broadest scope of the present invention best fitting the disclosed principles and new characteristics of the invention described herein.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. It should be understood that the present invention is not intended to be limited only to the exemplary embodiments presented herein. Instead, the present invention seeks to provide a broadest scope of the present invention best fitting the disclosed principles and new characteristics of the invention described herein. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The present invention may be used in a wireless communication apparatus, such as a user equipment, a relay, a base station, and so on.

The invention claimed is:

1. A method for applying a PRB (Physical Resource Block) bundling by a first cell in a wireless communications system, the method comprising:
   setting a first cell and a second cell as a BBC (Bundling Cooperation Cells);
   receiving traffic information of a second cell,
   wherein the traffic information includes information on the traffic size transmitted through a single PRB and the traffic size transmitted through multiple PRBs, among downlink traffic data of the second cell;
   determining a resource for the first and the second cell to apply a same PRB bundling, based on the traffic information,
   wherein the same bundling is a pattern determined by whether data is transmitted through the single PRB or multiple PRBs over different subframes; and
   transmitting an information on the resource to a user equipment.

2. The method of claim 1, wherein the resource for applying the same PRB bundling is decided based upon a minimum value between a first traffic size being transmitted through the multiple PRBs by having the first cell apply the PRB bundling and a second traffic size being transmitted through the multiple PRBs by having the second cell apply the PRB bundling.

3. The method of claim 1, wherein the resource for applying the same PRB bundling is sequentially decided starting from a subframe of a lower index.

4. The method of claim 1, wherein the information on the resource for applying the same PRB bundling is configured by a bitmap method.

5. The method of claim 1, wherein the information on the resource for applying the same PRB bundling is transmitted by using RRC (Radio Resource Control) signaling.

6. The method of claim 1, wherein the information on the resource for applying the same PRB bundling is transmitted by using DCI (Downlink Control Information).

7. A base station for applying a PRB (Physical Resource Block) bundling in a wireless communications system, the base station comprising:
   a RF (Radio Frequency) unit; and
   a processor, that:
   sets a first cell and a second cell as a BBC (Bundling Cooperation Cells),
   controls the RF unit to receive a traffic information of a neighboring base station,
   wherein the traffic information includes information on the traffic size transmitted through a single PRB and the traffic size transmitted through multiple PRBs, among the downlink traffic data of the second cell,
   determines a resource for the base station and the neighboring base station to apply the same PRB bundling, based on the traffic information,
   wherein the same bundling is a pattern determined by whether data is transmitted through the single PRB or multiple PRBs over different subframes, and
   controls the RF unit to transmit an information on the resource to a user equipment.

* * * * *